(12) United States Patent
Shinada

(10) Patent No.: US 6,529,261 B2
(45) Date of Patent: Mar. 4, 2003

(54) APPARATUS FOR AND METHOD OF RECORDING IMAGE

(75) Inventor: Hidetoshi Shinada, Hertfordshire (GB)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/858,949

(22) Filed: May 17, 2001

(65) Prior Publication Data

US 2001/0043317 A1 Nov. 22, 2001

(30) Foreign Application Priority Data

May 18, 2000 (JP) .................................... 2000-145914

(51) Int. Cl.⁷ ............................. G03B 27/52; B41J 2/47
(52) U.S. Cl. ............................. 355/41; 355/40; 347/239
(58) Field of Search ................... 355/38–41, 67, 355/71, 18; 359/224, 291; 347/239, 244

(56) References Cited

U.S. PATENT DOCUMENTS

| | | | |
|---|---|---|---|
| 5,049,901 A | | 9/1991 | Gelbart ...................... 346/108 |
| 5,083,857 A | * | 1/1992 | Hornbeck ................... 359/291 |
| 5,132,723 A | | 7/1992 | Gelbart ........................ 355/40 |
| 5,510,824 A | * | 4/1996 | Nelson ........................ 347/239 |
| 5,517,359 A | | 5/1996 | Gelbart | 
| 5,646,713 A | * | 7/1997 | Powers et al. ................ 355/40 |
| 5,771,060 A | | 6/1998 | Nelson |
| 6,208,369 B1 | * | 3/2001 | Oren et al. .................. 247/244 |
| 6,288,830 B1 | * | 9/2001 | Knoshita ..................... 359/292 |

FOREIGN PATENT DOCUMENTS

| | | |
|---|---|---|
| EP | 0739125 A2 * | 10/1996 |
| JP | 6-100829 | 12/1994 |
| WO | WO 00/69631 A1 | 11/2000 |

OTHER PUBLICATIONS

Hornbeck, Larry J., "Digital Light Processing™ for High–Brightness, High–Resolution Applications", Texas Instruments, Feb. 10–12, 1997.
Derwent Publications Ltd., London, GB; Class P75, AN 1999–305536 XP002186652 & IL 119 099; May 9, 1999.

* cited by examiner

Primary Examiner—Henry Hung Nguyen
(74) Attorney, Agent, or Firm—Sughrue Mion, PLLC

(57) ABSTRACT

A light beam emitted from a light source is supplied to an optical modulator having cells that are controlled depending on image information to be recorded, and then light beams reflected by the cells are guided to a light collecting device. The light beams are then collected in an auxiliary scanning direction and reach a photosensitive medium to record an image thereon. The cells of the optical modulator are individually controlled in a main scanning direction depending on different image information, and controlled in the auxiliary scanning direction depending on identical image information.

13 Claims, 14 Drawing Sheets

APPARATUS FOR AND METHOD OF RECORDING IMAGE

BACKGROUND OF THE INVENTION

1. Field of the Invention

The present invention relates to an apparatus for and a method of recording a two-dimensional image on a photosensitive medium by scanning the photosensitive medium with a light beam in main and auxiliary scanning directions.

2. Description of the Related Art

There has been developed a light switch for use as an optical modulator in recording two-dimensional images. The light switch comprises a two-dimensional array of small many movable mirrors that are individually displaceable depending on image information to be recorded. When a light beam is applied to the movable mirrors that have been displaced depending on the image information, the movable mirrors reflect respective light beams that are selectively supplied to an image recording medium to record a two-dimensional image based on the image information on the image recording medium.

A high-power light source is required to record two-dimensional images of sufficient density with light beams that are reflected by the small movable mirrors of the light switch.

One conventional arrangement that has been proposed to meet such a requirement is disclosed in Japanese patent publication No. 6-100829. In the disclosed system, as shown in FIGS. 12 through 14 of the accompanying drawings, a light beam L reflected by an optical modulator 4 is applied via a condensing lens 6 to a photosensitive medium 2 that is being fed in an auxiliary scanning direction indicated by the arrow Y, for thereby recording an image on the photosensitive medium 2. The optical modulator 4 comprises three arrays, juxtaposed in the auxiliary scanning direction, of movable mirrors 8 that are arrayed in a main scanning direction perpendicular to the sheet of FIG. 12 and the auxiliary scanning direction.

The light beam L is initially reflected by the first array of movable mirrors 8 which is located downstream in the auxiliary scanning direction, and applied via the condensing lens 6 to the photosensitive medium 2, forming pixels thereon, as shown in FIG. 12. As the photosensitive medium 2 moves in the auxiliary scanning direction, only the second array of movable mirrors 8 is actuated to guide the light beam L to the same pixels on the photosensitive medium 2 as those shown in FIG. 12, as shown in FIG. 13. Then, upon continued movement of the photosensitive medium 2 in the auxiliary scanning direction, only the third array of movable mirrors 8 is actuated to guide the light beam L to the same pixels on the photosensitive medium 2 as those shown in FIG. 12, as shown in FIG. 14. In this manner, three movable mirrors 8 are used per pixel on the photosensitive medium 2 to record an image with a sufficient amount of light.

For recording images on the photosensitive medium 2 in the manner described above, it is necessary to individually actuate the movable mirrors 8 of the optical modulator 4 in the main scanning direction, and also to control the arrays of movable mirrors 8 at a speed in synchronism with the speed at which the photosensitive medium 2 is fed in the auxiliary scanning direction. Such a process of actuating the mirrors 8 and controlling the arrays of movable mirrors 8 is complex.

SUMMARY OF THE INVENTION

It is a general object of the present invention to provide an apparatus for and a method of recording an image on a photosensitive medium with a light beam having an amount of light that is large enough to record images.

A primary object of the present invention is to provide an apparatus for and a method of recording a quality image on a photosensitive medium according to a simple control process.

Another primary object of the present invention is to provide an apparatus for and a method of recording a quality image on a photosensitive medium at a reduced cost.

Still another primary object of the present invention is to provide an apparatus for and a method of recording a quality image on a photosensitive medium at a high speed.

Yet another primary object of the present invention is to provide an apparatus for and a method of recording a quality image free of shading on a photosensitive medium.

According to the present invention, an optical modulator has a matrix of cells arrayed in main and auxiliary scanning directions, and controls a light beam emitted from a light source by controlling the cells arrayed in a main scanning direction according to image information depending on positions thereof in the main scanning direction and controlling the cells arrayed in an auxiliary scanning direction according to identical image information. A light collecting means collects light beams-controlled by the optical modulator in the auxiliary scanning direction and guides the collected light beams to a photosensitive medium.

Since a plurality of light beams are collected on each of pixels that make up an image and applied to the photosensitive medium, the image can be recorded on the photosensitive medium with a sufficient level of light energy. The cells of the optical modulator that are arrayed in the auxiliary scanning direction may be controlled based on identical image information. Thus, the image can be recorded on the photosensitive medium according to a highly simple control process.

Each of the cells comprises a movable mirror for reflecting the light beam, the movable mirror being displaceable depending on the image information to guide the light beam to the photosensitive medium.

By controlling the number of the cells arrayed in the auxiliary scanning direction for simultaneous activation, the amount of light of the light beams collected in the auxiliary scanning direction and guided to the photosensitive medium can be adjusted for each pixel in the main scanning direction.

The light collecting means may comprise a plurality of light collecting means arrayed in the auxiliary scanning direction for simultaneously producing images made up of a plurality of main scanning lines. Since the size of the light collecting means in the auxiliary scanning direction can be reduced, each of the light collecting means can be manufactured with ease.

If the photosensitive medium is made of a photosensitive material of high intensity reciprocity law failure, then the photosensitive medium can be fed at an increased speed in the auxiliary scanning direction to allow an image to be recorded thereon at an increased speed.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
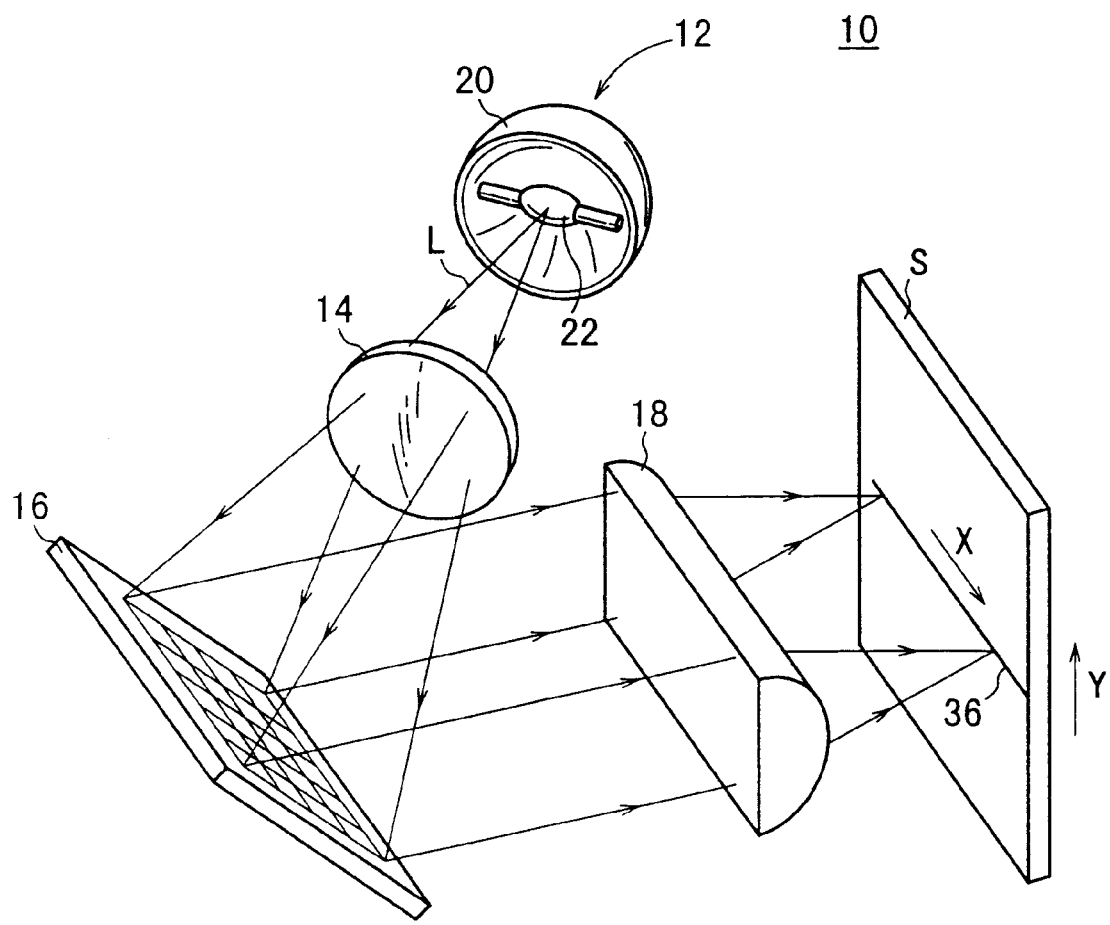
FIG. 1 is a perspective view of an image recording apparatus according to an embodiment of the present invention.

Like or corresponding parts are denoted by like or corresponding reference characters throughout views.

Figure 2:
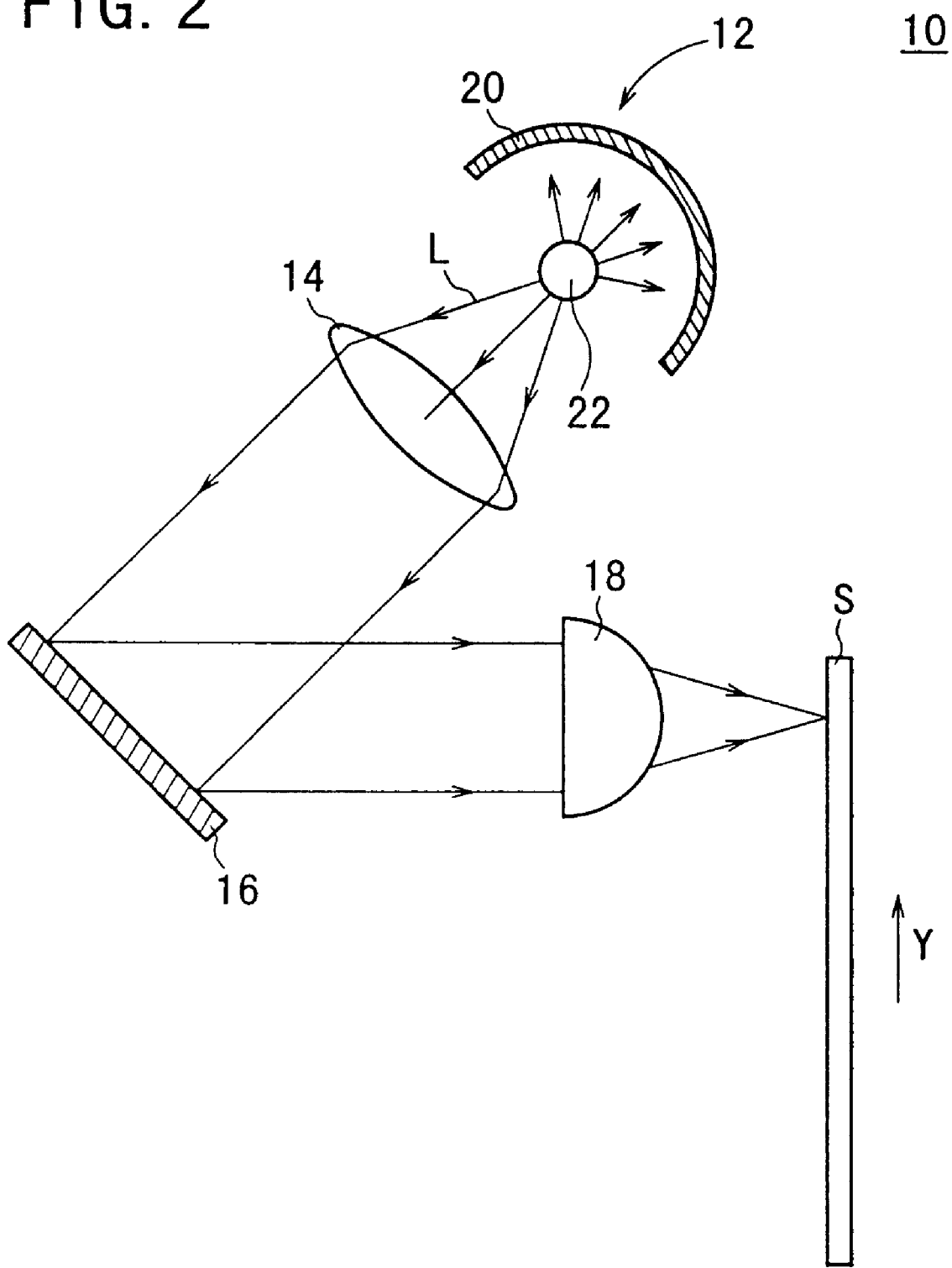
FIG. 2 is a side elevational view of the image recording apparatus shown in FIG. 1.

FIGS. 1 and 2 show an image recording apparatus 10 according to an embodiment of the present invention. As shown in FIGS. 1 and 2, the image recording apparatus 10 comprises a light source 12, a condensing lens 14, an optical modulator 16, and a cylindrical lens 18 (light collecting means). The image recording apparatus 10 serves to record a two-dimensional image on a photosensitive medium S.

The light source 12 comprises a hemispherical reflecting member 20 having an inner circumferential surface processed to a mirror finish and a xenon lamp 22 fixedly mounted on the reflecting member 20 for emitting a light beam L from an emission point that is located at the spherical center of the reflecting member 20. The condensing lens 14 is positioned on an open side of the reflecting member 20 such that the emission point of the xenon lamp 22 is located at the focal point of the condensing lens 14. The light beam L emitted from the xenon lamp 22 travels in part directly to the condensing lens 14 and is reflected in part by the reflecting member 20 to the condensing lens 14. The light beam L is then converted by the condensing lens 14 into a parallel light beam, which is then applied to the optical modulator 16.

Figure 3:
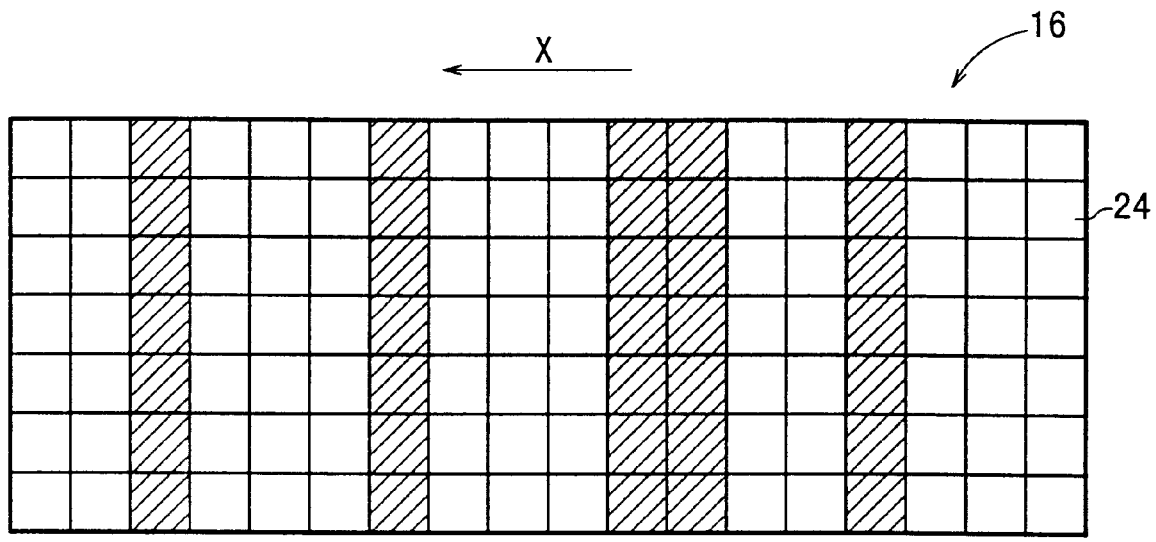
FIG. 3 is a front elevational view of an optical modulator of the image recording apparatus shown in FIG. 1.
Figure 4:
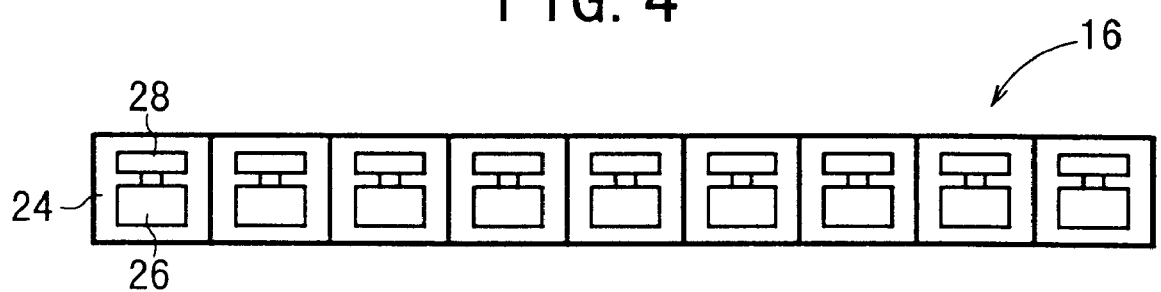
FIG. 4 is a side elevational view of the optical modulator of the image recording apparatus shown in FIG. 1.

As shown in FIG. 3, the optical modulator 16 is of a rectangular shape that is elongate in a main scanning direction indicated by the arrow X (see also FIG. 1). The optical modulator 16 comprises a matrix of small cells 24 each basically comprising, as shown in FIG. 4, an actuator 26 and a movable mirror 28 angularly displaceable by the actuator 26. The optical modulator 16 may comprise Digital Micromirror Device (registered trademark) (DMD (registered trademark)) manufactured and sold by Texas Instruments Incorporated, for example. The DMD includes an array of CMOS semiconductor memory cells each functioning as the actuator 26 and an array of microscopic mirrors of aluminum angularly movably disposed on the respective CMOS semiconductor memory cells. When a signal representing image information is supplied to each of the CMOS semiconductor memory cells, an electrostatic attractive force is developed due to a voltage difference between the CMOS semiconductor memory cell and the corresponding microscopic mirror for thereby angularly displacing the microscopic mirror in a certain direction.

The cylindrical lens 18 collects the light beams L that have been reflected by the cells 24 of the optical modulator 16 in the certain direction, in an auxiliary scanning direction indicated by the arrow Y that is perpendicular to the main scanning direction X, and guides the light beams L onto the photosensitive medium S. The photosensitive medium S is fed in the auxiliary scanning direction Y.

Figure 5:
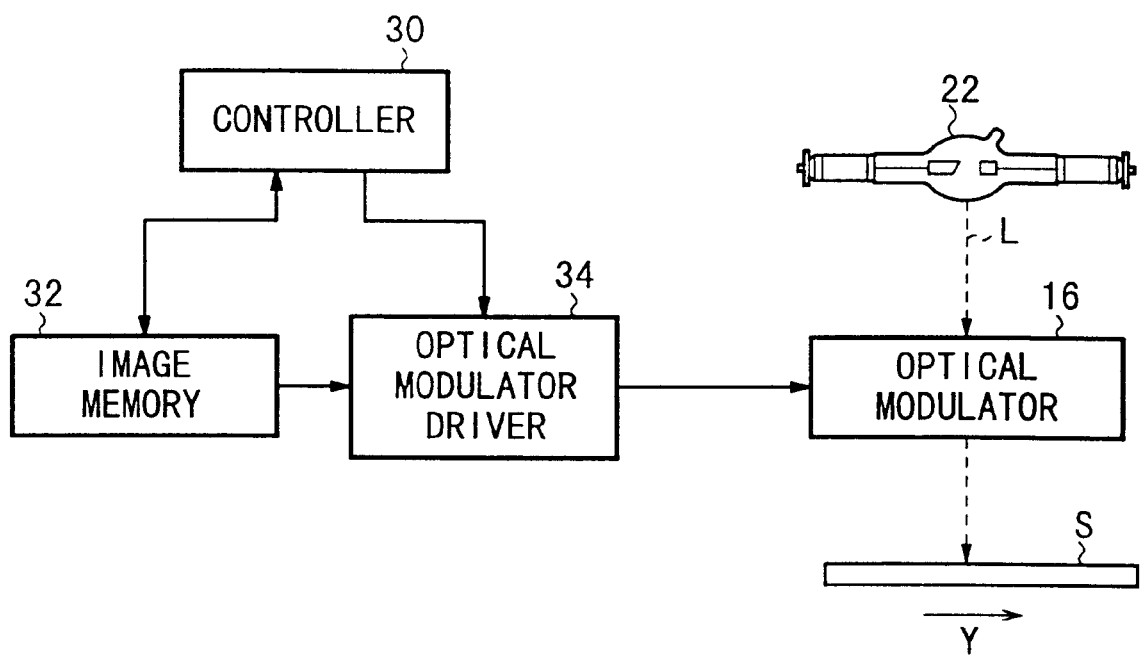
FIG. 5 is a block diagram of a control circuit of the image recording apparatus shown in FIG. 1.

FIG. 5 shows in block form a control circuit of the image recording apparatus 10 thus constructed. As shown in FIG. 5, the control circuit comprises a controller 30 for controlling overall operation of the image recording apparatus 10, an image memory 32 for storing image information to be recorded on the photosensitive medium S, and an optical modulator driver 34 for energizing the optical modulator 16 based on the image information that is supplied from the image memory 32.

The image recording apparatus 10 is basically arranged as described above. Operation of the image recording apparatus 10 will now be described below.

The controller 30 supplies the image information stored in the image memory 32 to the optical modulator driver 34. Based on the supplied image information, the optical modulator driver 34 supplies a drive signal to the actuator 26 of each of the cells 24 of the optical modulator 16. The actuator 26 then angularly displaces the corresponding movable mirror 28 in a certain direction according to the supplied drive signal.

Specifically, when a drive signal for recording a pixel on the photosensitive medium S is supplied to a actuator 26, the actuator 26 controls the corresponding movable mirror 28 to reflect the light beam L from the condensing lens 14 along the optical axis of the cylindrical lens 18. When no pixel is to be recorded on the photosensitive medium S, a drive signal is supplied to a actuator 26, which controls the corresponding movable mirror 28 to reflect the light beam L from the condensing lens 14 in a direction out of the optical path of the cylindrical lens 18. In this control process, the movable mirrors 28 of the cells 24 that are arrayed in the auxiliary scanning direction Y as shown hatched in FIG. 3 are angularly positioned in the same direction.

Figure 6:
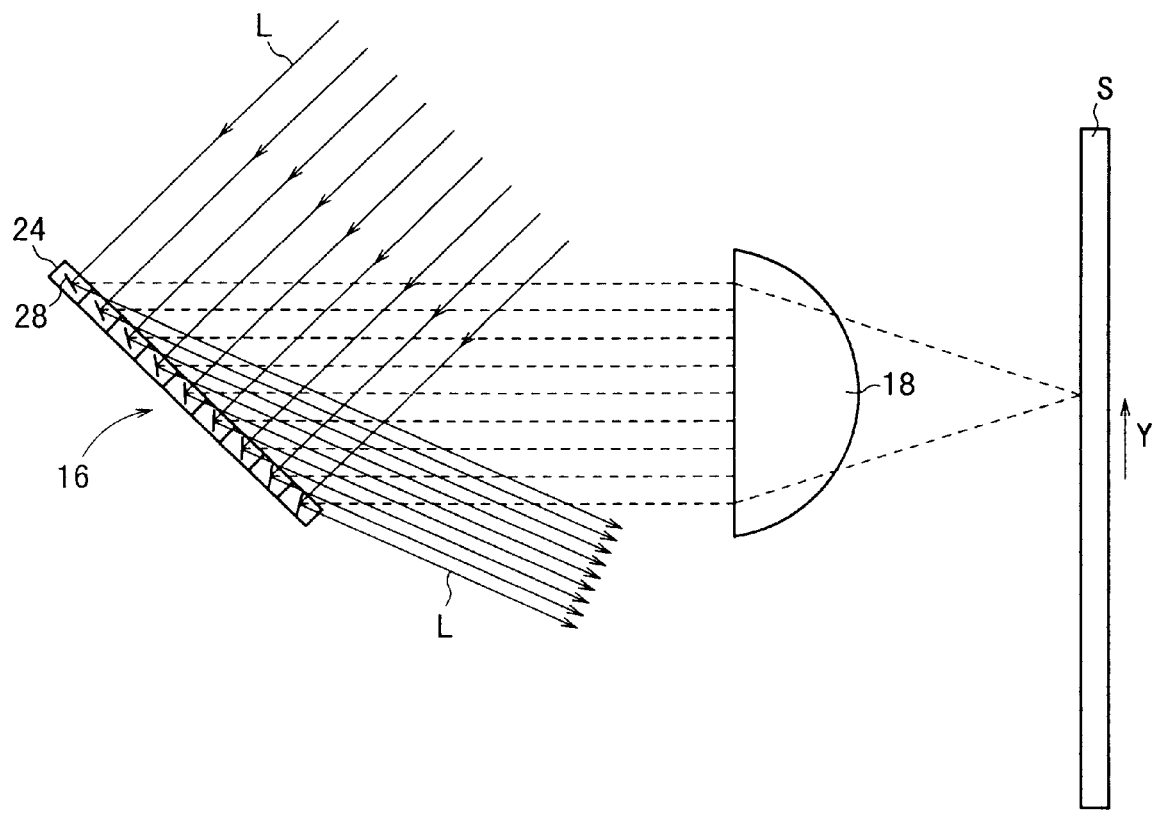
FIG. 6 is a side elevational view showing a setting of the optical modulator for not recording pixels on the photosensitive medium.
Figure 7:
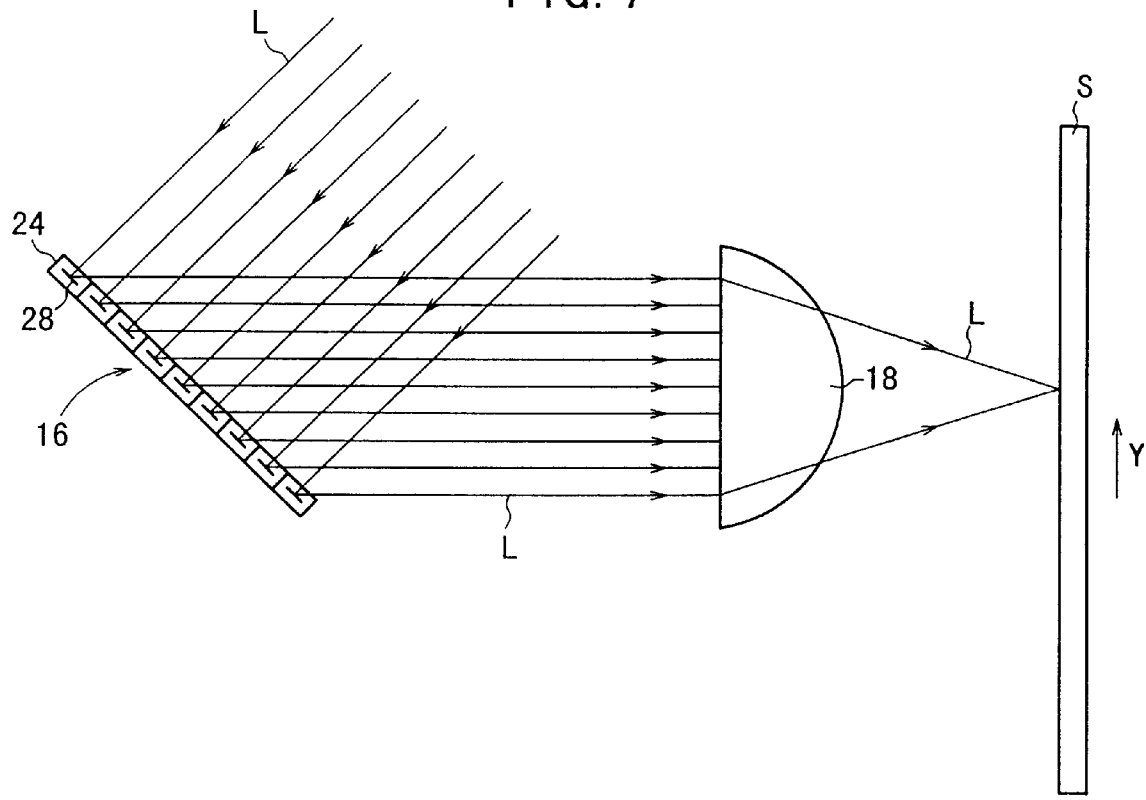
FIG. 7 is a side elevational view showing a setting of the optical modulator for recording pixels on a photosensitive medium.
Figure 8:
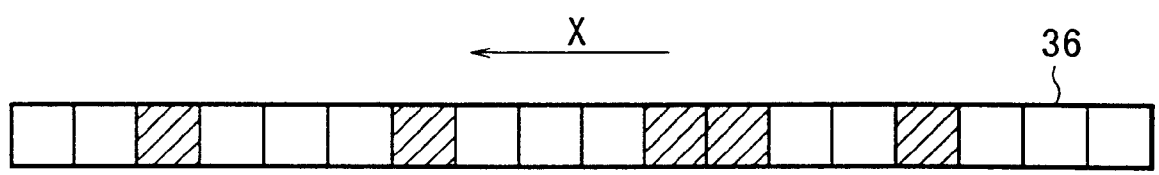
FIG. 8 is a view showing a main scanning line that is recorded by the optical modulator with a setting shown in FIG. 3.

The light beam L emitted from the xenon lamp 22 of the light source 12 is reflected in part by the reflecting member 20 to the condensing lens 14 and travels in part directly to the condensing lens 14. The condensing lens 14 converts the applied light beam L into a parallel light beam, which is then supplied to the optical modulator 16. When the movable mirrors 28 of the cells 24 are tilted or angularly displaced as shown in FIG. 6, they reflect the light beam L to travel out of the optical path of the cylindrical lens 18. When the movable mirrors 28 of the cells 24 are angularly positioned as shown in FIG. 7, they reflect the light beam L to travel along the optical axis of the cylindrical lens 18. Therefore, the light beams L reflected by the movable mirrors 28 of the optical modulator 16 that is set to the position shown in FIG. 7 are collected in the auxiliary scanning direction Y by the cylindrical lens 18, and guided onto the photosensitive medium S, forming a single main scanning line 36 thereon (see FIGS. 1 and 8). At this time, the photosensitive medium S is fed in the auxiliary scanning direction Y. Therefore, a two-dimensional image is recorded on the photosensitive medium S.

Since the movable mirrors 28 of the cells 24 that are arrayed in the auxiliary scanning direction Y as are angularly positioned in the same direction, the respective light beams L reflected by the movable mirrors 28 are collected in the auxiliary scanning direction Y, thus producing the main scanning line 36 with a sufficient amount of light. Accordingly, it is not necessary to employ a high-power light source to generate the light-beam L, but the cylindrical lens 18 is capable of sufficiently utilize the energy of the light beam L emitted from the xenon lamp 22. As a result, the photosensitive medium S can be scanned at a high speed to record images thereon efficiently at a low cost.

Since the energy of the light beams L reflected by the movable mirrors 24 is intensified to produce a main scanning line 36 at a high light intensity level on the photosensitive medium S, the photosensitive medium S may be made of a photosensitive material of high intensity reciprocity law failure. Use of such a photosensitive material of high intensity reciprocity law failure allows images to be recorded thereon at a higher speed.

Figure 9:
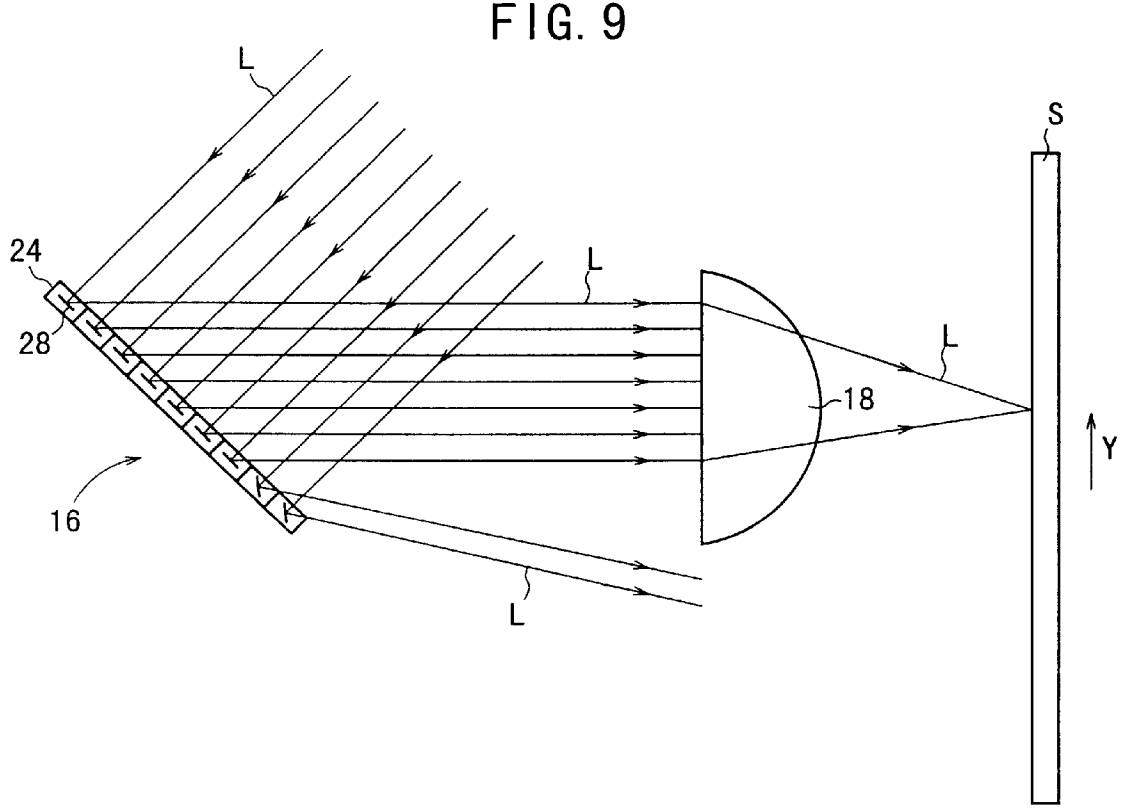
FIG. 9 is a side elevational view showing a setting of the optical modulator for making an adjustment such as shading correction.

The main scanning line 36 is produced on the photosensitive medium S by collecting the light beams L reflected by the respective movable mirrors 28 in the auxiliary scanning direction Y. Therefore, the optical system does not cause shading in the auxiliary scanning direction Y. However, light intensity irregularities may possibly occur on the photosensitive medium S in the main scanning direction X due to the $\cos^4$ law of the condensing lens 14. This drawback can be eliminated by not angularly displacing all the movable mirrors 28 arrayed in the auxiliary scanning direction Y in the same direction, but angularly displacing some of those movable mirrors 28 in a different direction, as shown in FIG. 9, to adjust the light intensity of the main scanning line 36 with respect to the main scanning line X for thereby producing a main scanning line 36 free of light intensity irregularities. Furthermore, shading can be corrected by controlling the time during which the movable mirrors 28 are actuated thereby to adjust the time during which the light beams L are applied to the photosensitive medium S. These adjusting processes can also be used to an adverse effect due to an operation failure of some of the cells 24 of the optical modulator 16.

In the present embodiment, the light source 12 employs the xenon lamp 22 that is nearly a point light source and the light beam L emitted therefrom is applied to and converted by the condensing lens 14 into a parallel beam. However, a laser beam emitted from a laser may be guided by a collimator lens as a parallel laser beam to the optical modulator 16.

Figure 10:
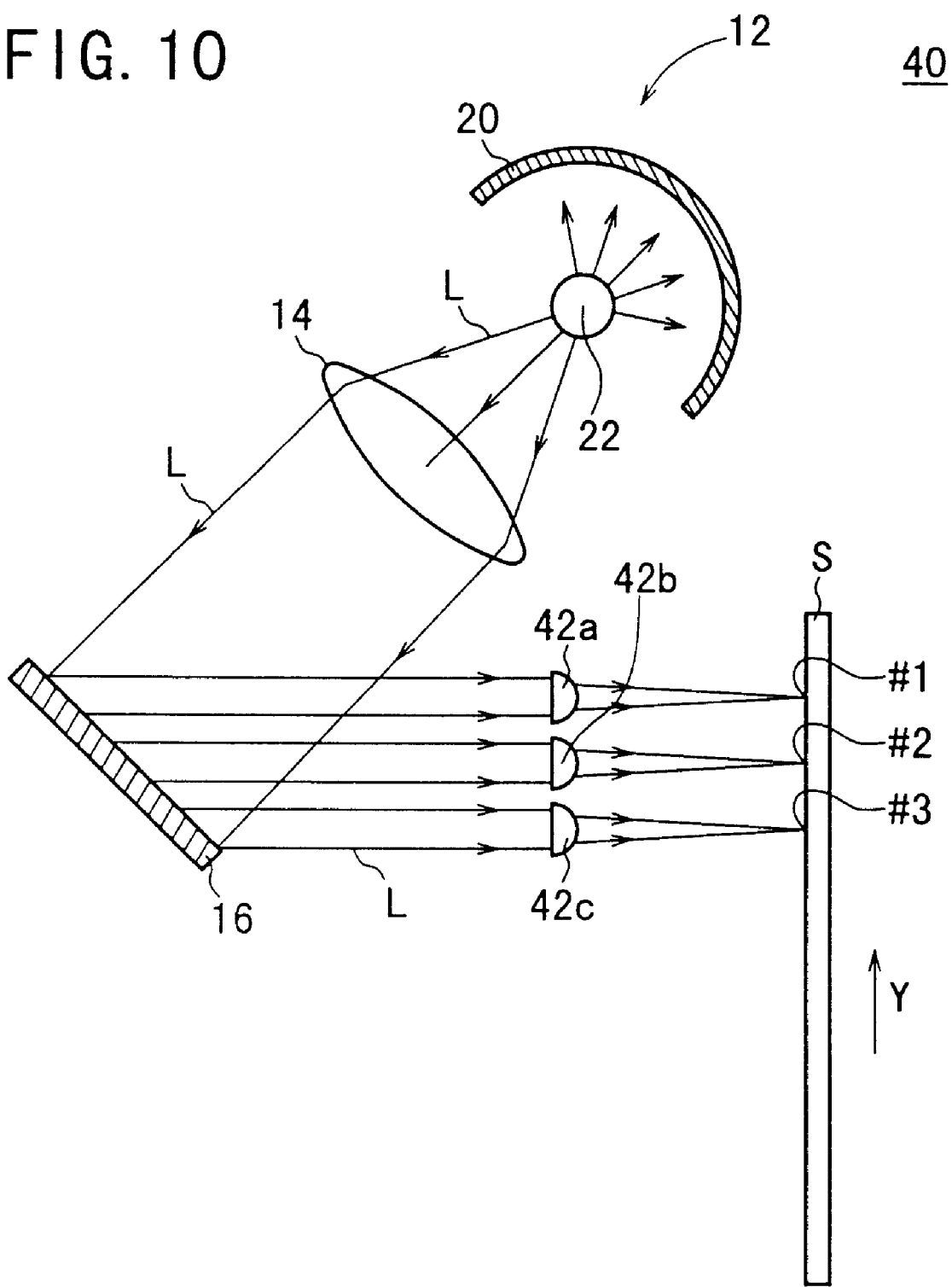
FIG. 10 is a side elevational view of an image recording apparatus according to another embodiment of the present invention.

FIG. 10 shows an image recording apparatus 40 according to another embodiment of the present invention. As shown in FIG. 10, the image recording apparatus 40 is different from the image recording apparatus 10 shown in FIG. 1 that the cylindrical lens 18 shown in FIG. 1 is replaced with three cylindrical lenses 42a, 42b, 42c that are arrayed in the auxiliary scanning direction Y. Other details of the image recording apparatus 40 are identical to those of the image recording apparatus 10 shown in FIG. 1, and will not be described in detail below.

In the image recording apparatus 40, the-light beam L emitted from the xenon lamp 22 is converted by the condensing lens 14 into a parallel light beam, which is reflected by the optical modulator 16 that is controlled depending on image information to be recorded. The reflected light beams L from the optical modulator 16 are applied via respective cylindrical lenses 42a through 42c to the photosensitive medium S, thus producing respective three main scanning lines #1 through #3 simultaneously on the photosensitive medium S. The optical modulator 16 has a plurality of arrays of cells 24 (see FIG. 3) that are arranged in the auxiliary scanning direction Y for reflecting the respective light beams L to the cylindrical lenses 42a through 42c, respectively.

Figure 11:
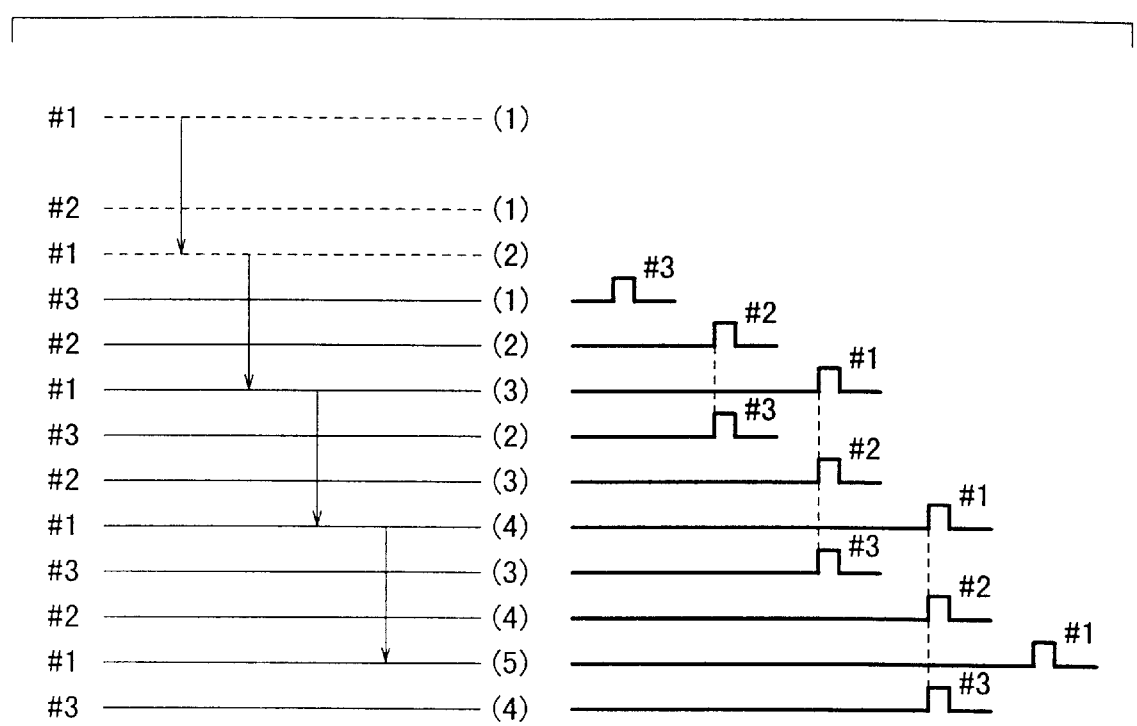
FIG. 11 is a timing chart of an image recording method carried out by the image recording apparatus shown in FIG. 10.
Figure 12:
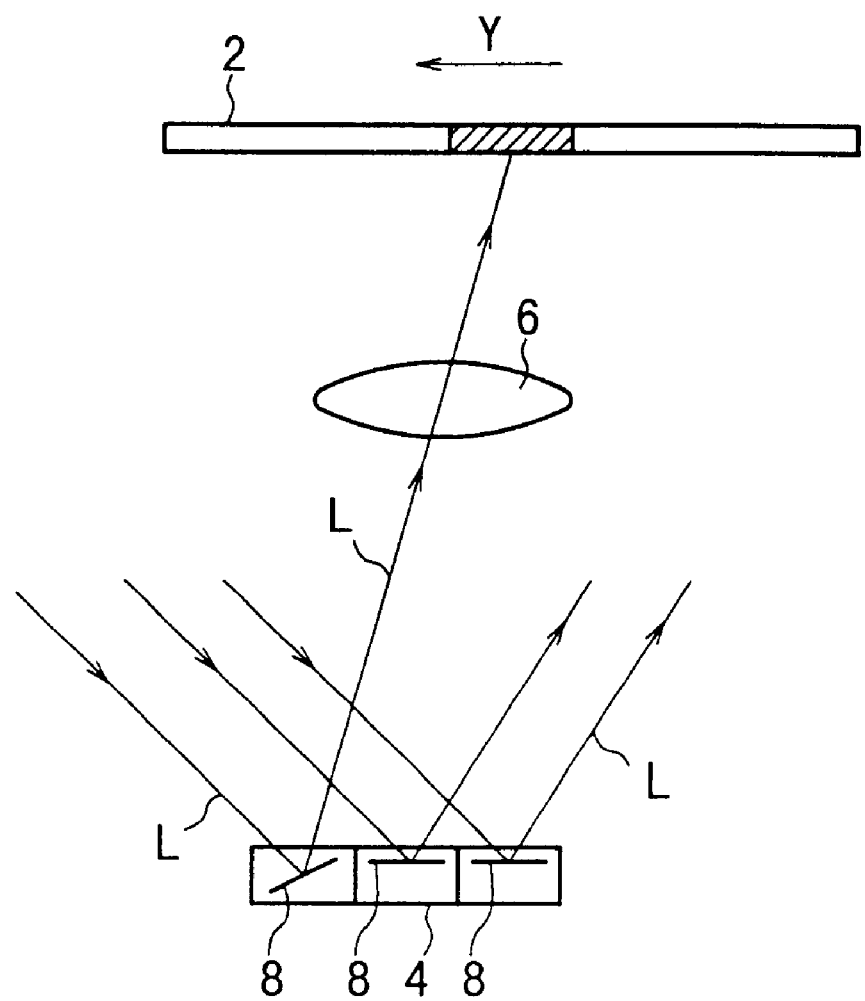
FIGS. 12 through 14 are side elevational views illustrative of a conventional image recording method.
Figure 13:
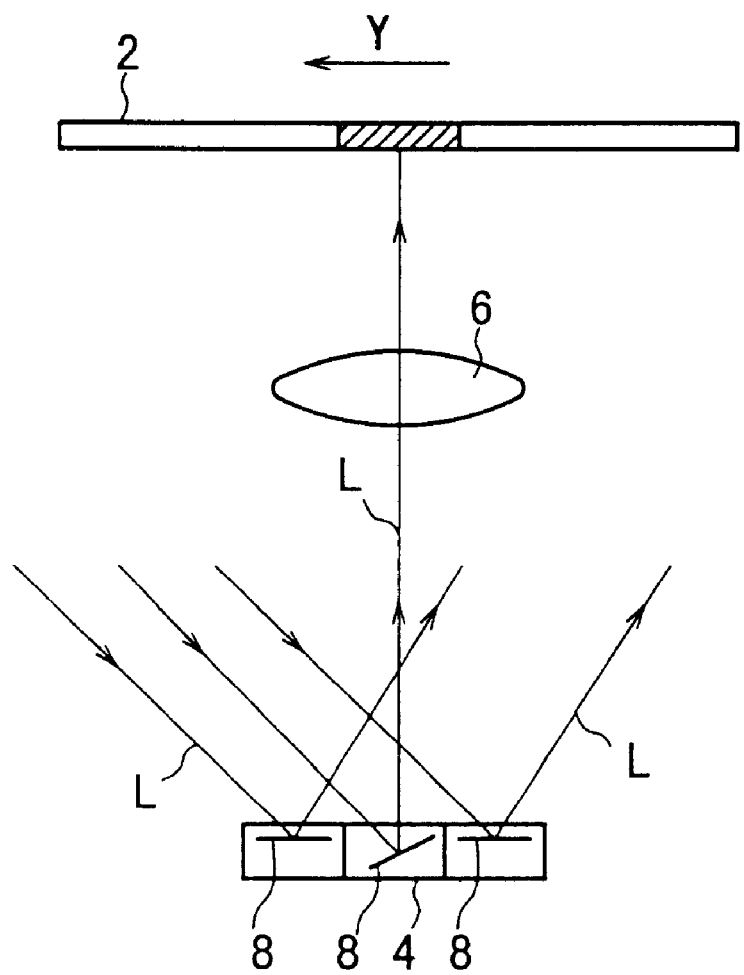
Figure 14:
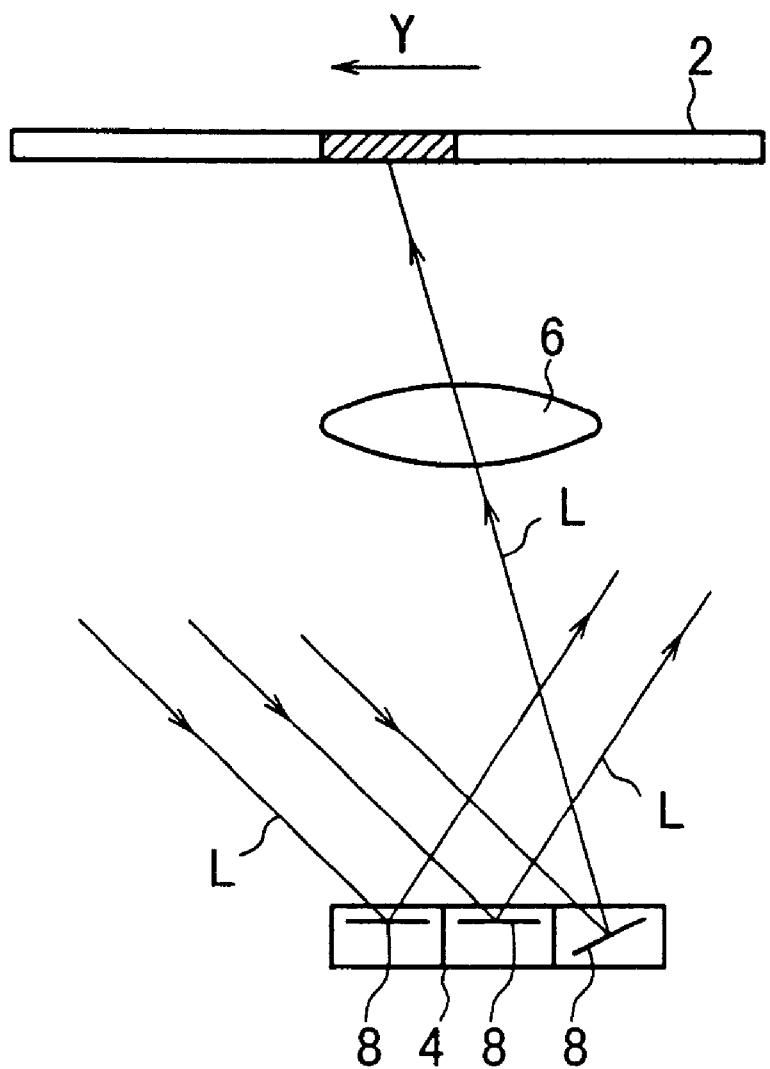

An image recording method carried out by the image recording apparatus 40 shown in FIG. 10 using the three main scanning lines #1 through #3 will be described below with reference to a timing chart shown in FIG. 11. It is assumed that the simultaneously recorded main scanning lines #1 through #3 are spaced at intervals that are twice the intervals between main scanning lines that make up an image that is recorded on the photosensitive medium S. The image recording apparatus 40 is controlled by the control circuit shown in FIG. 5.

The controller 30 sends a control signal for actuating only those cells 24 which will produce the main scanning line #3 to the optical modulator driver 34, which energizes the optical modulator 6 to record an image (1) with the main scanning line #3 on the photosensitive medium S based on image information supplied from the image memory 32.

Then, the controller 30 feeds the photosensitive medium S in the auxiliary scanning direction Y by a pitch P between the main scanning lines #1 through #3. Thereafter, the controller 30 sends control signals for actuating those cells 24 which will produce the main scanning lines #2, #3 to the optical modulator driver 34, which energizes the optical modulator 6 to simultaneously record two images (2) with the main scanning lines #2, #3 on the photosensitive medium S based on image information supplied from the image memory 32.

Then, the controller 30 feeds the photosensitive medium S in the auxiliary scanning direction Y again by the pitch P between the main scanning lines #1 through #3. Thereafter, the controller 30 sends control signals for actuating those cells 24 which will produce the main scanning lines #1, #2, #3 to the optical modulator driver 34, which energizes the optical modulator 6 to simultaneously record three images (3) with the main scanning lines #1, #2, #3 on the photosensitive medium S based on image information supplied from the image memory 32.

Subsequently, the controller 30 repeats a process of feeding the photosensitive medium S in the auxiliary scanning direction Y by the pitch P and then simultaneously recording three images with the main scanning lines #1, #2, #3, for thereby recording a two-dimensional image on the photosensitive medium S.

In this manner, it is possible to record a two-dimensional image on the photosensitive medium S at a rate that is three times the rate for recording a two-dimensional image on the image recording apparatus 10 shown in FIG. 1, with the main scanning lines #1, #2, #3 at a high light intensity level. Another advantage offered by the image recording apparatus 40 shown in FIG. 10 is that since the cylindrical lenses 42a through 42c are smaller in size, they can easily be manufactured, allowing the image recording apparatus 40 to be manufactured easily and inexpensively.

Although certain preferred embodiments of the present invention have been shown and described in detail, it should be understood that various changes and modifications may be made therein without departing from the scope of the appended claims.

What is claimed is:

1. An apparatus for recording a two-dimensional image on a photosensitive medium by scanning the photosensitive medium, comprising:

a memory configured to store image information related to the two-dimensional image;

a light source for emitting light beams;

an optical modulator having a matrix of cells configured to receive the light beams emitted from the light source; wherein the cells of the matrix are arranged along an auxiliary scanning direction so as to form a plurality of columns; wherein the columns are arranged next to each other along a main scanning direction; and wherein the optical modulator is configured to control positions of the cells of the matrix so as to deflect the light beams to the photosensitive material; and a light collecting arrangement configured to collect the light beams deflected from the plurality of columns so as to form, at a single point in time, a scanning line extending along the main scanning direction on the photosensitive material.

2. An apparatus according to claim 1, wherein each of said cells comprises:

a movable mirror for reflecting the light beams, said movable mirror being displaceable depending on the image information to control a direction in which said light beams are reflected by said movable mirror.

3. An apparatus according to claim 2, wherein each of said cells comprises:

a CMOS semiconductor memory for being supplied with the image information and displacing said movable mirror depending on the image information supplied thereto, said movable mirror being angularly movably disposed on said CMOS semiconductor memory.

4. An apparatus according to claim 1, wherein the number of said cells arrayed in the auxiliary scanning direction which are controlled by said optical modulator is adjustable for correcting light intensity irregularities of said light beams applied to said photosensitive medium in the main scanning direction.

5. An apparatus according to claim 1, wherein the time in which said cells arrayed in the auxiliary scanning direction are controlled by said optical modulator is adjustable for correcting light intensity irregularities of said light beams applied to said photosensitive medium in the main scanning direction.

6. An apparatus according to claim 1, wherein said light collecting arrangement comprises a plurality of light collecting means arrayed in the auxiliary scanning direction, and said optical modulator comprises means for controlling the light beam with respect to each of said light collecting means depending on the image information.

7. An apparatus according to claim 1, wherein said photosensitive medium is made of a photosensitive material of high intensity reciprocity law failure.

8. An apparatus according to claim 1, further comprising:

a condensing lens disposed between said light source and said optical modulator for converting the light beams emitted from said light source into parallel light beams and applying the parallel light beams to said optical modulator.

9. An apparatus according to claim 8, wherein said light collecting arrangement comprises:

a cylindrical lens disposed between said optical modulator and said photosensitive medium for collecting the light beams from said optical modulator only in the auxiliary scanning direction.

10. An apparatus according to claim 1, wherein said light source comprises:

a laser for emitting laser beams as said light beams, said apparatus further comprising:

a collimator lens disposed between said laser and said optical modulator for guiding said laser beams as parallel laser beams to said optical modulator.

11. A method of recording a two-dimensional image on a photosensitive medium by scanning the photosensitive medium, comprising the steps of:

guiding light beams emitted from a light source to an optical modulator having a matrix of cells arrayed in main and auxiliary scanning directions;

controlling positions of the cells according to image information related to the two-dimensional image ; and collecting the light beams controlled by said optical modulator in the auxiliary scanning direction and guiding the collected light beams to the photosensitive medium so as to form, at a single point in time, a scanning line along the main scanning direction on said photosensitive medium.

12. A method according to claim 11, further comprising the step of:

adjusting the number of said cells arrayed in the auxiliary scanning direction which are controlled by said optical modulator for correcting light intensity irregularities of said light beams applied to said photosensitive medium in the main scanning direction.

13. A method according to claim 11, further comprising the step of:

adjusting the time in which said cells arrayed in the auxiliary scanning direction are controlled by said optical modulator for correcting light intensity irregularities of said light beams applied to said photosensitive medium in the main scanning direction.

* * * * *